(12) United States Patent  
Tichenor

(10) Patent No.: US 9,277,807 B2  
(45) Date of Patent: Mar. 8, 2016

(54) TREE STAND TABLE DEVICE

(71) Applicant: Rick Tichenor, Indianapolis, IN (US)

(72) Inventor: Rick Tichenor, Indianapolis, IN (US)

( * ) Notice: Subject to any disclaimer, the term of this patent is extended or adjusted under 35 U.S.C. 154(b) by 0 days.

(21) Appl. No.: 14/328,030

(22) Filed: Jul. 10, 2014

(65) Prior Publication Data

US 2016/0007730 A1    Jan. 14, 2016

(51) Int. Cl.
  *A47B 5/00*     (2006.01)
  *A47B 5/02*     (2006.01)
  *A47B 13/16*    (2006.01)

(52) U.S. Cl.
  CPC .. *A47B 5/02* (2013.01); *A47B 13/16* (2013.01)

(58) Field of Classification Search
  CPC .......... A47B 96/027; A47B 5/02; A47B 5/04; E04G 1/152; A01M 31/002; A01M 31/02
  USPC ........... 108/152, 137, 108; 182/129, 223, 187
  See application file for complete search history.

(56) References Cited

U.S. PATENT DOCUMENTS

| | | | |
|---|---|---|---|
| 1,722,402 A | | 7/1929 | Veilleux |
| 3,358,789 A * | 12/1967 | Laun ............................. 108/152 |
| 4,409,907 A | 10/1983 | Norton |
| 4,449,612 A * | 5/1984 | Southard ....................... 108/152 |
| 4,705,143 A * | 11/1987 | Ziemba ......................... 108/152 |
| 4,834,217 A * | 5/1989 | Manes ........................... 108/152 |
| 4,890,694 A * | 1/1990 | Williams ....................... 108/152 |
| 4,942,942 A * | 7/1990 | Bradley ......................... 108/152 |
| 5,234,077 A | 8/1993 | Sheriff |
| 5,355,974 A * | 10/1994 | Miller ............................ 108/152 |
| 5,518,083 A | 5/1996 | Blennert |
| 5,727,760 A * | 3/1998 | Wytovak et al. ............... 182/187 |
| 6,205,935 B1 * | 3/2001 | Lindaman ...................... 108/152 |
| 6,244,556 B1 * | 6/2001 | Carrillo et al. ................. 182/187 |
| 6,478,272 B1 | 11/2002 | McKinsey et al. |
| 6,510,922 B1 * | 1/2003 | Hodnett ......................... 182/187 |
| 6,561,477 B1 * | 5/2003 | Prive ............................... 248/339 |
| 6,997,111 B2 * | 2/2006 | Giegerich ........................ 108/25 |
| D655,532 S | 3/2012 | Saelid |
| 8,231,095 B2 | 7/2012 | Bean |
| 8,469,206 B2 | 6/2013 | Wilson |
| 8,668,175 B2 * | 3/2014 | Koleszar ........................ 108/152 |
| 8,863,765 B2 * | 10/2014 | Heilman ......................... 182/187 |
| 2013/0186310 A1 * | 7/2013 | Lymberis ....................... 108/152 |
| 2014/0008149 A1 | 1/2014 | Fogel |

FOREIGN PATENT DOCUMENTS

EP      0985366 A2    5/2001

OTHER PUBLICATIONS

Title of Source: www.sportsmanguide.com Product Name: HME Treestand Shelf.

* cited by examiner

*Primary Examiner* — Jose V Chen

(57) ABSTRACT

A tree stand table device provides a table surface proximate a tree stand. The device includes a surface and an arm coupled to and extending from the surface. The arm has a distal end relative to the surface. A threaded stud is coupled to and extends from the distal end of the arm for coupling to a tree proximate a tree stand such that the surface is accessible to a person perched in the tree stand.

9 Claims, 9 Drawing Sheets

TREE STAND TABLE DEVICE

BACKGROUND OF THE DISCLOSURE

Field of the Disclosure

The disclosure relates to table devices and more particularly pertains to a new table device for providing a table surface proximate a tree stand.

SUMMARY OF THE DISCLOSURE

An embodiment of the disclosure meets the needs presented above by generally comprising a surface and an arm coupled to and extending from the surface. The arm has a distal end relative to the surface. A threaded stud is coupled to and extends from the distal end of the arm for coupling to a tree proximate a tree stand such that the surface is accessible to a person perched in the tree stand.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
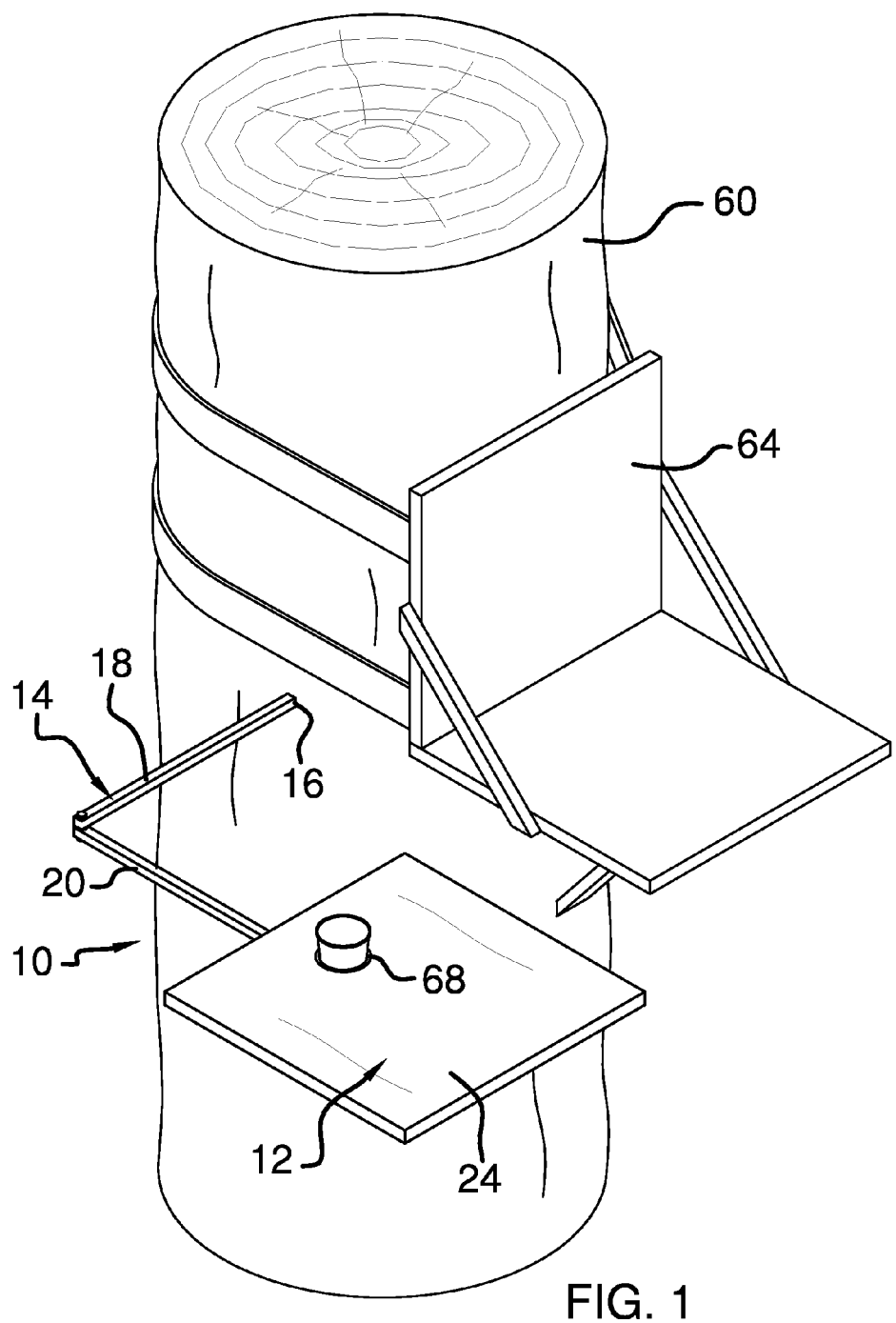
FIG. 1 is a top front side perspective view of a tree stand table device according to an embodiment of the disclosure.
Figure 2:
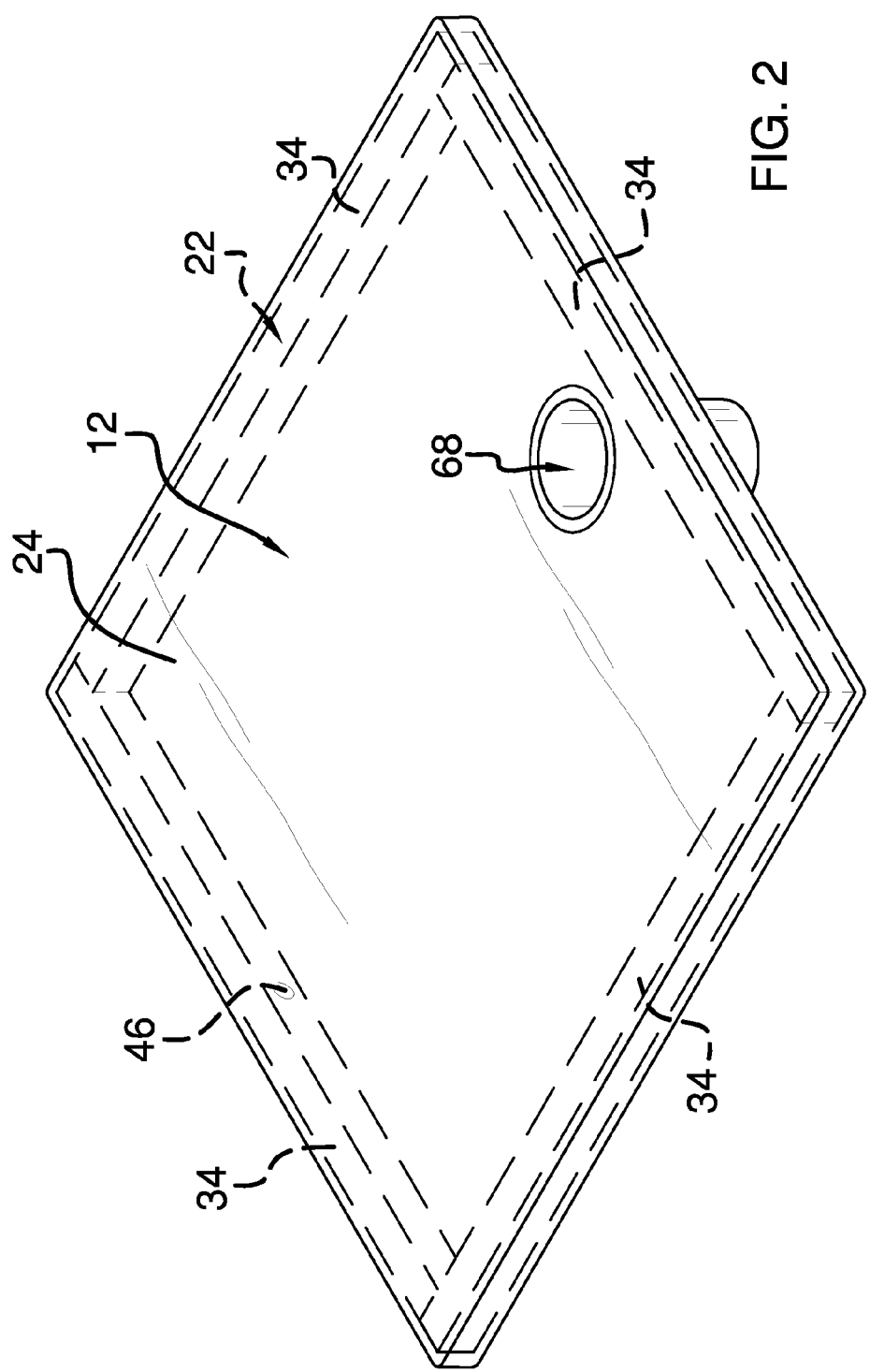
FIG. 2 is a top front side perspective view of an embodiment of the disclosure.
Figure 3:
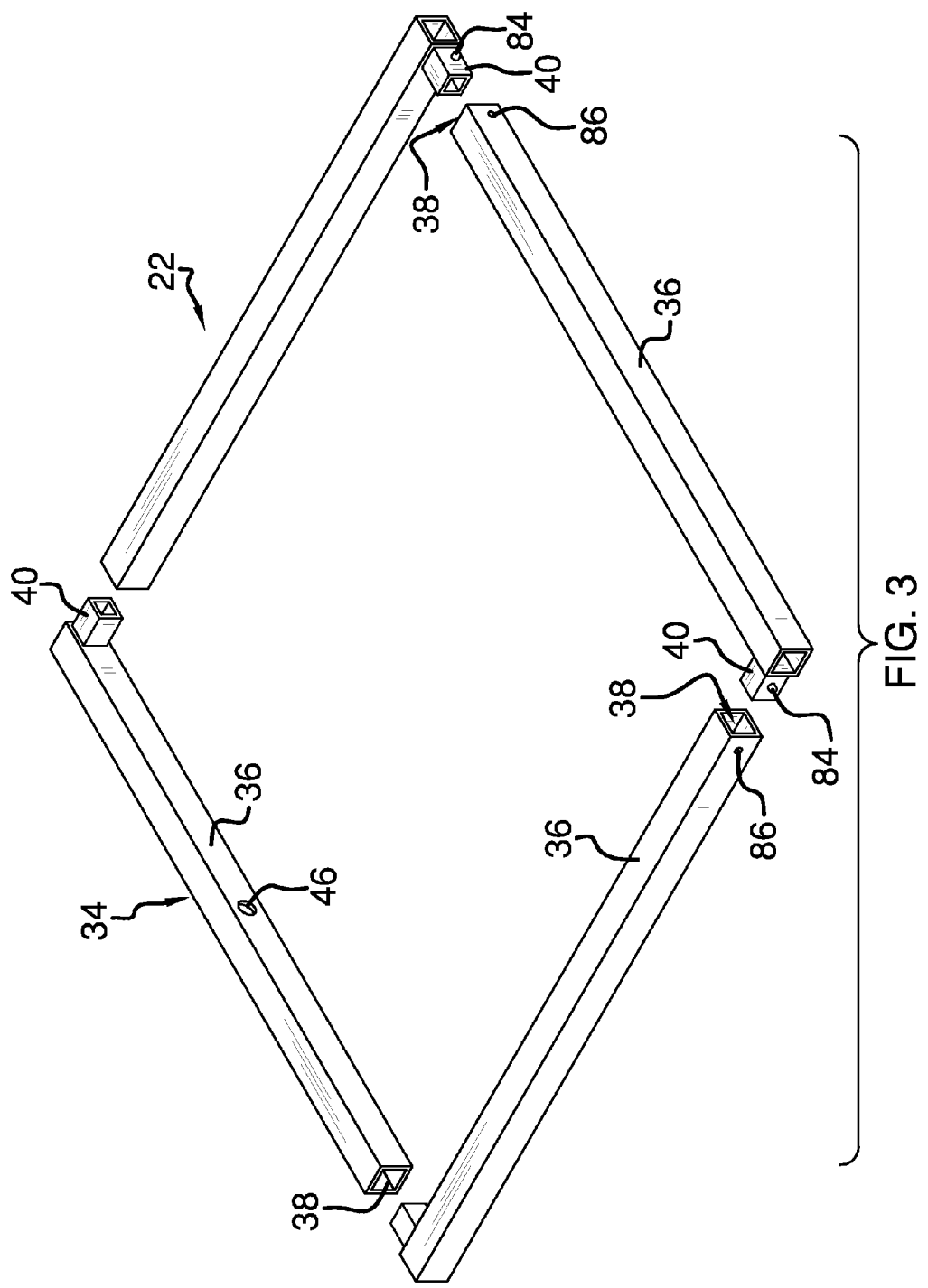
FIG. 3 is a partially exploded top front side perspective view of a frame of an embodiment of the disclosure.
Figure 4:
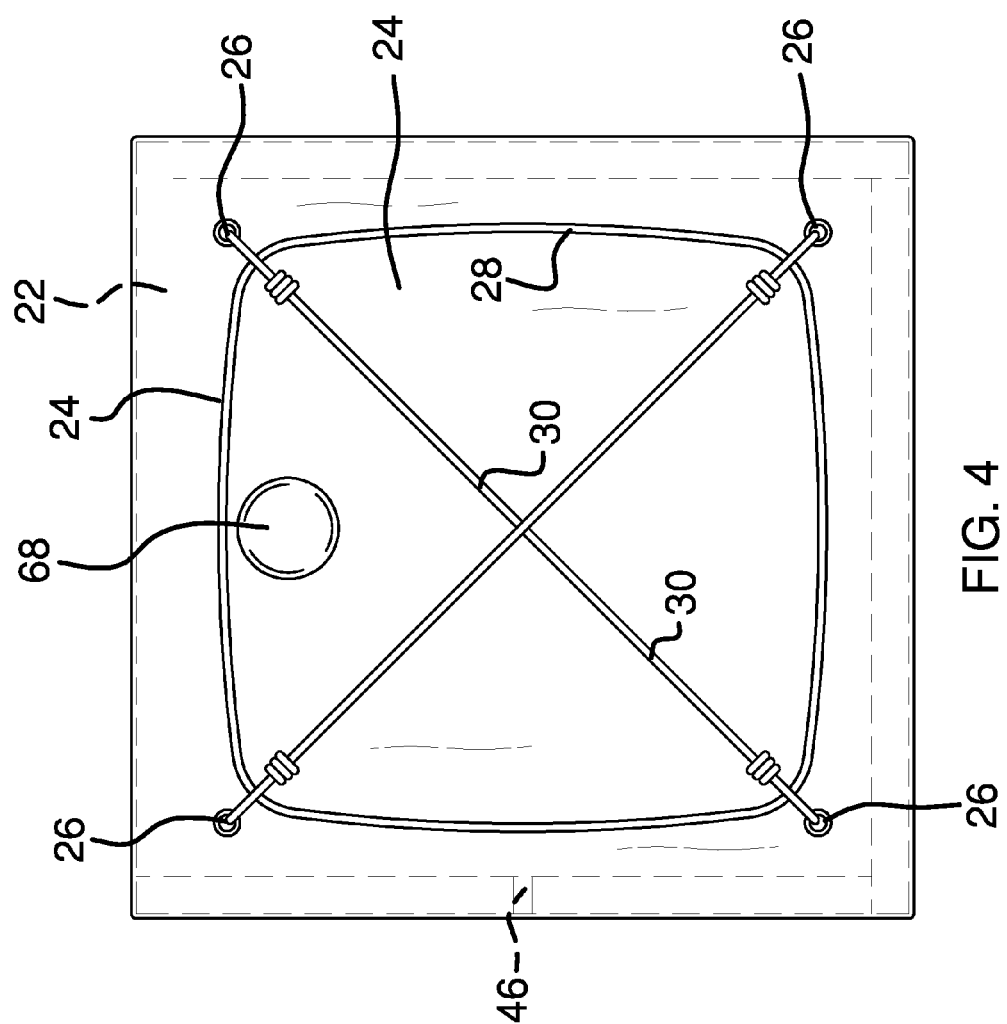
FIG. 4 is a bottom view of an embodiment of the disclosure.

With reference now to the drawings, and in particular to FIGS. 1 through 9 thereof, a new table device embodying the principles and concepts of an embodiment of the disclosure and generally designated by the reference numeral 10 will be described.

As best illustrated in FIGS. 1 through 9, the tree stand table device 10 generally comprises a surface 12 defined by a sheet of material 24 such as cloth or the like. An arm 14 is coupled to and extends from the surface 12. The arm 14 has a distal end 16 relative to the surface 12. The arm 14 has a first section 18 pivotally coupled to a second section 20 such that the first section 18 and second section 20 pivot within a plane. A frame 22 is coupled to the surface 12 and provides structure to the sheet of material 24. The sheet of material 24 is coupled to the frame 22 such that the sheet of material 24 is held in tension on the frame 22. The sheet of material 24 may be provided with holes 26 positioned adjacent to a peripheral edge 28 of the sheet of material 24. Each of a plurality of resilient cords 30 is coupled to the sheet of material 24 using the holes 26 wherein the resilient cords 30 impart tension to the sheet of material 24 wherein the sheet of material 24 is secured to the frame 22.

The arm 14 has a proximal end 32 relative to the surface 12. The proximal end 32 of the arm 14 is coupled to the frame 22. The frame 22 has a plurality of interconnected sections 34. Each section 34 may have similar structure including an elongated body 36, a socket end 38, and a plug 40 extending transversely from the body 36. Each plug 40 may have a biased pin 84 to engage an opening 86 in a conventional manner to secure the plug 40 in the socket end 38. Thus, the sections 34 may be assembled to form a square which may provide an area for the surface 12 of between 35 and 45 square centimeters. The interconnected section 34 are separable to facilitate storage and transport of the frame 22 when not in use.

A projection 42 is coupled to and extends from the proximal end 32 of the arm 14. The projection 42 is more specifically a hook 44 extending from the arm 14. An aperture 46 extends through the frame 22. The projection 42 is insertable through the aperture 46. A pin 48, such as a cotter pin or the like, is engageable to the projection 42 wherein the pin 48 secures the projection 42 in the aperture 46 whereby the arm 14 is coupled to the frame 22. The pin 48 is insertable through the hook 44 adjacent to a distal end 50 of the hook 44 relative to the arm 14. A stabilizer 52 is coupled to a proximal section 54 of the hook 44 relative to the arm 14. The stabilizer 52 extends outwardly from opposite sides 56 of the hook 44 such that the frame 22 is aligned with the stabilizer 52 when the hook 44 is fully inserted through the aperture 46. Thus, the stabilizer 52 inhibits rotation of the frame 22 about a distal section 58 of the hook 44 relative to the arm 14.

Figure 5:
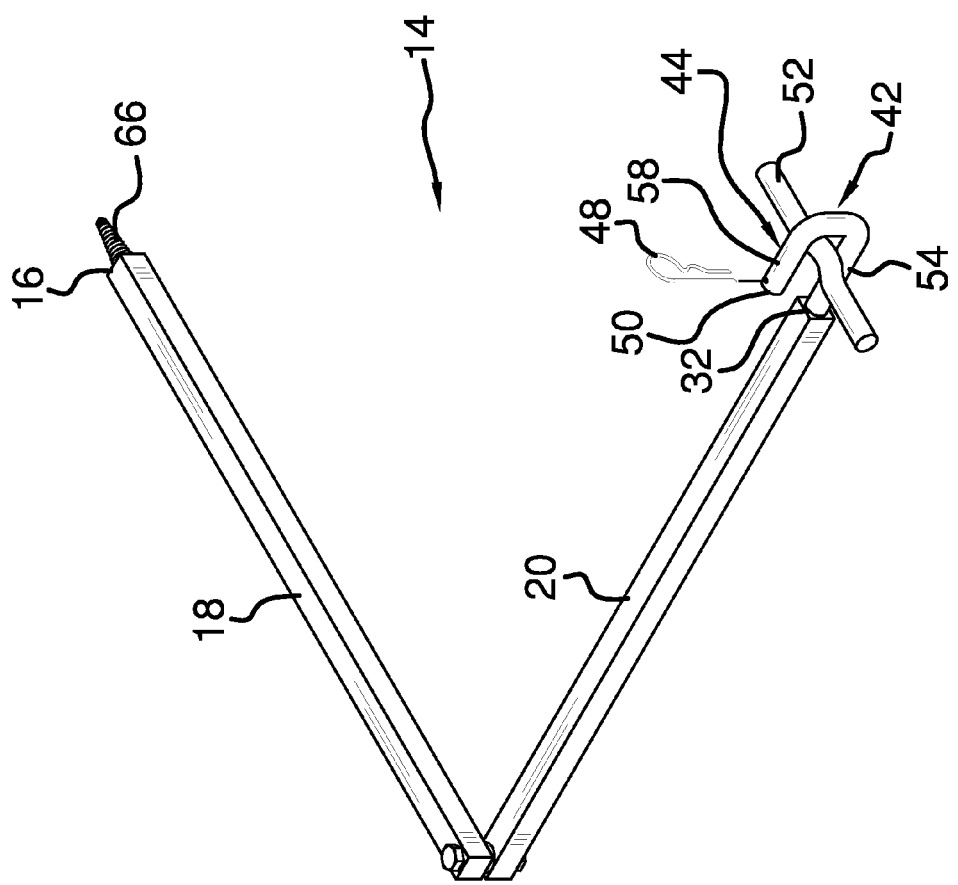
FIG. 5 is a top front side perspective view of an arm of an embodiment of the disclosure.
Figure 6:
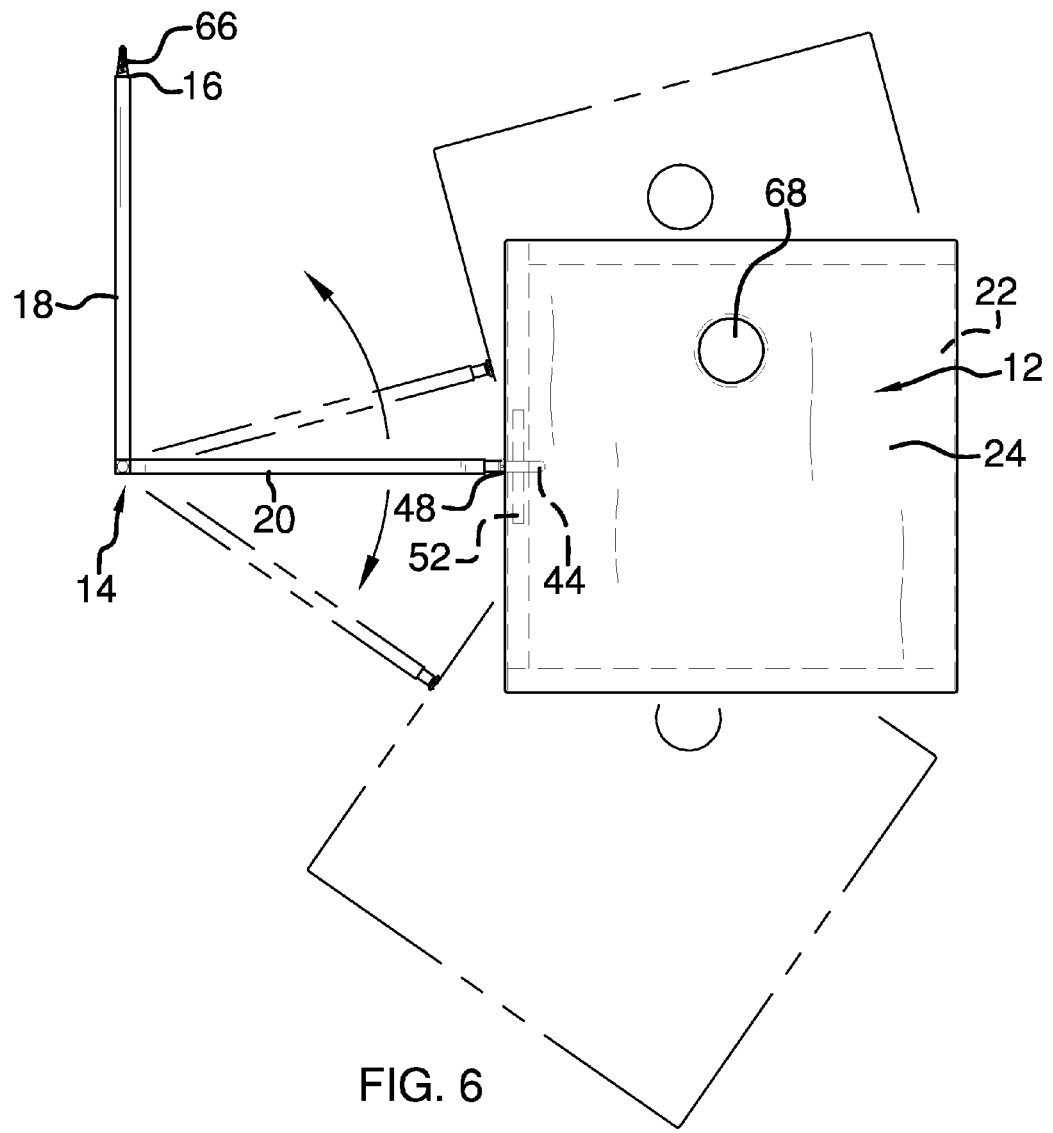
FIG. 6 is a top view of an embodiment of the disclosure.
Figure 7:
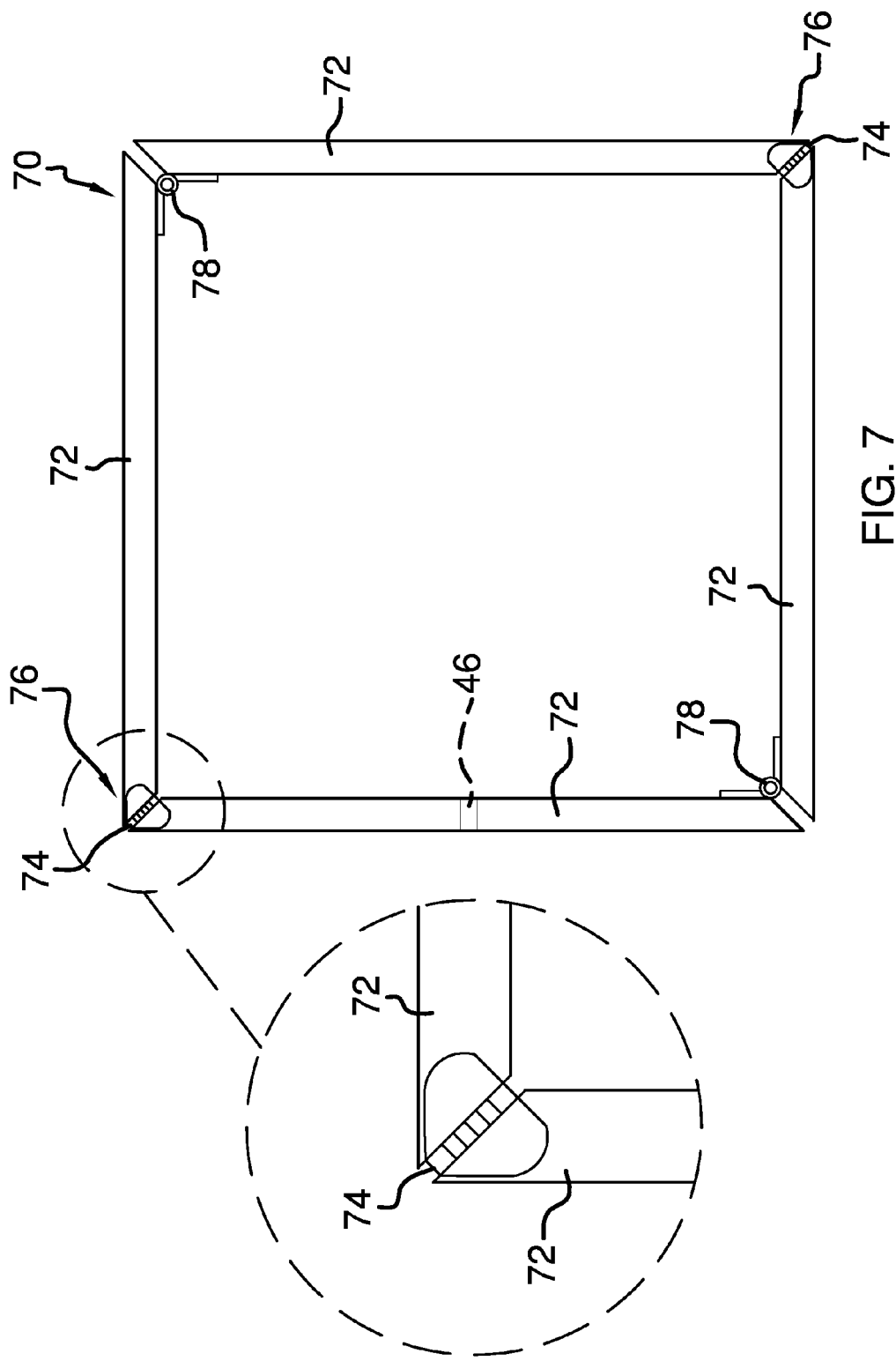
FIG. 7 is a top view of an embodiment of the disclosure.

The arm 14 is configured for coupling to a tree 60 adjacent to a tree stand 64 as shown in FIG. 1. As seen in FIG. 5, a threaded stud 66 is coupled to and extends from the distal end 16 of the arm 14 wherein the arm 14 is configured for coupling to the tree 60 proximate the tree stand 64 such that the surface 12 is accessible to a person perched in the tree stand 64. A cup holder 68, or similar type of pocket, may be coupled to and extend into the surface 12.

Figure 8:
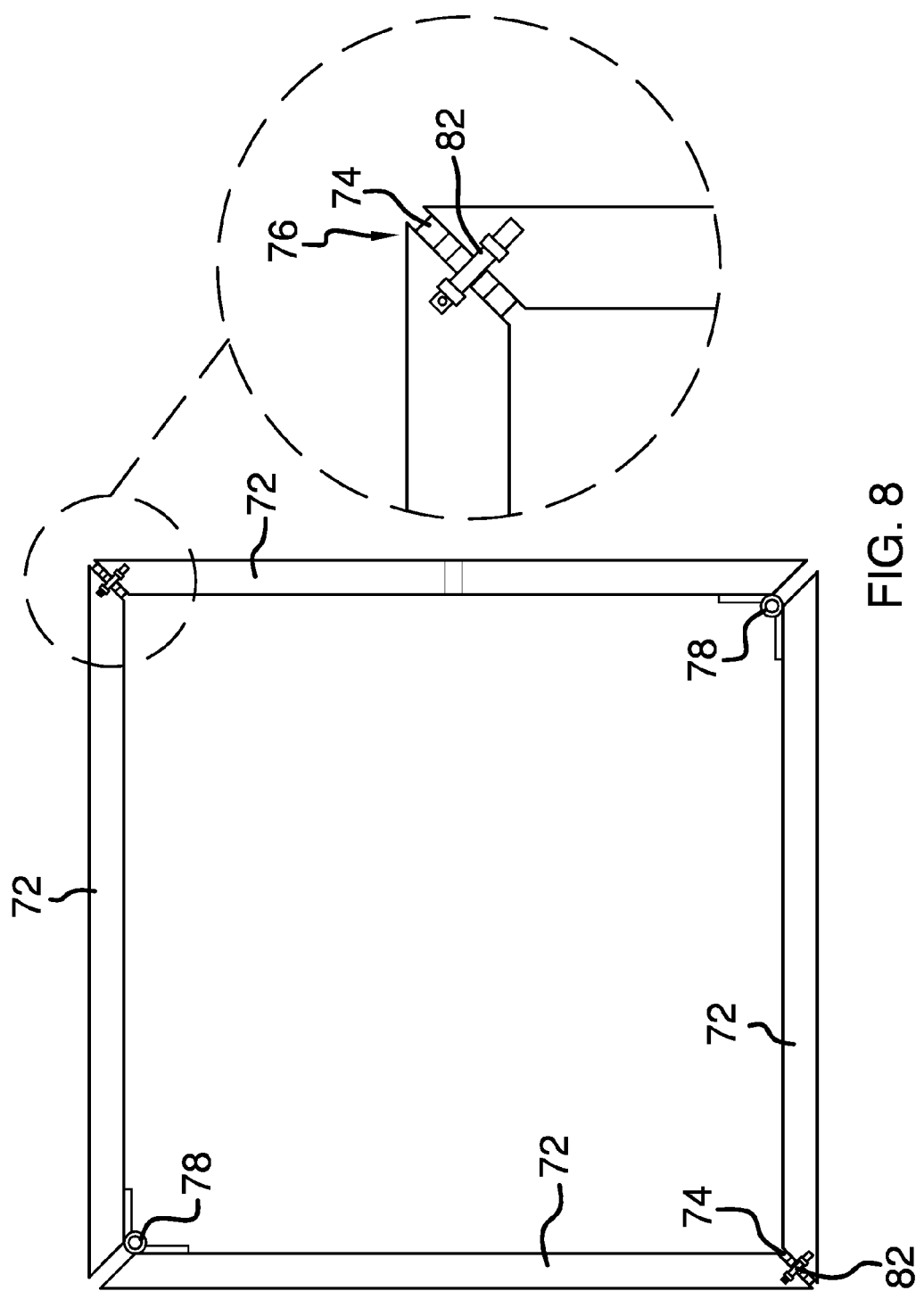
FIG. 8 is a bottom view of an embodiment of the disclosure.
Figure 9:
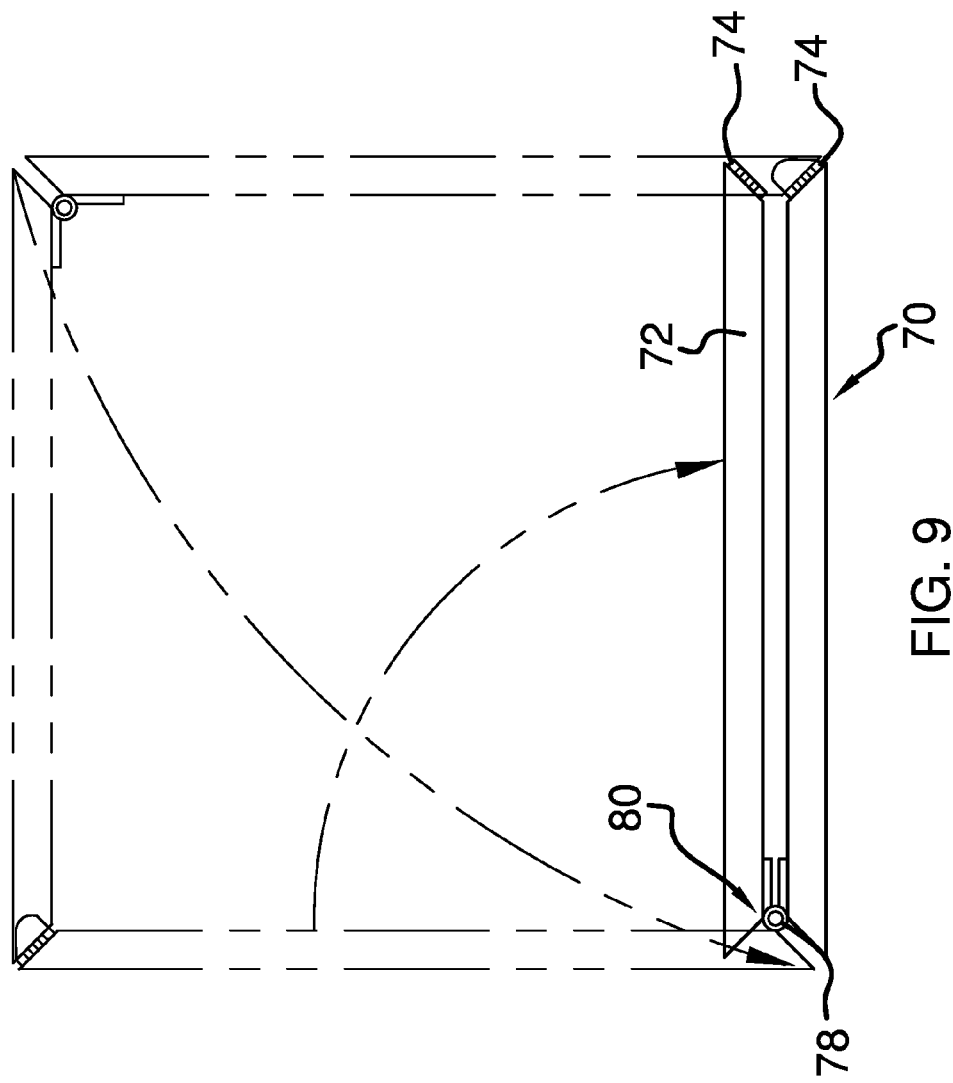
FIG. 9 is a bottom view of an embodiment of the disclosure.

In FIGS. 7 through 9, 10, an alternative frame 70 may be provided and function similarly to frame 22. Frame 70 has a plurality of side sections 72 pivotally coupled together such that the side sections 72 are pivotable between an expanded position, in which frame 70 is rectangular, and a collapsed position, in which frame 70 is folded such that the side sections 72 are all substantially parallel. The side sections 72 are connected by first hinges 74 allowing pivoting of opposite joints 76 to form an L-shape. The side sections 72 are connected by second hinges 78 allowing pivoting of aligned joints 80, as seen in FIG. 9, to collapse the frame 70 into a compact unit. Each of a plurality of locks 82, as exemplified in the detailed area of FIG. 8, are coupled to the frame 70 opposite the first hinges 74 to prevent pivoting of the side sections 72 into the L-shape thus holding the frame 70 in the extended position when the lock 82 is engaged.

In use, the arm 14 is coupled to the tree 60 in a desired position. The frame 22, or frame 70, is assembled or expanded and coupled to the arm 14. The surface 12 is then secured to the frame 22 or frame 70 and may be used as a table adjacent to the tree stand 64.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tree stand table device comprising:
   a surface;
   an arm coupled to and extending from said surface, said arm having a distal end relative to said surface;
   a threaded stud coupled to and extending from said distal end of said arm wherein said arm is configured for coupling to a tree proximate a tree stand such that said surface is accessible to a person perched in the tree stand;
   a frame coupled to said surface, said arm having a proximal end relative to said surface, said proximal end of said arm being coupled to said frame, said frame having a plurality of side sections, said side sections being pivotally coupled together such that said side sections are pivotable between an expanded position and a collapsed position; and
   a plurality of locks coupled to said frame, each of said locks holding said frame in said extended position by preventing pivoting of said side sections when said lock is engaged.

2. The device of claim 1, further comprising said arm having a first section pivotally coupled to a second section.

3. The device of claim 1, further comprising a cup holder coupled to and extending into said surface.

4. The device of claim 1, further comprising said surface being defined by a sheet of material coupled to said frame such that said sheet of material is held in tension on said frame.

5. The device of claim 1, further comprising:
   a projection coupled to and extending from said proximal end of said arm;
   an aperture extending through said frame, said projection being insertable through said aperture;
   a pin, said pin being engageable to said projection wherein said pin secures said projection in said aperture whereby said arm is coupled to said frame.

6. The device of claim 5, further comprising said projection being a hook extending from said arm, said pin being insertable through said hook adjacent to a distal end of said hook relative to said arm.

7. A tree stand table device comprising:
   a surface;
   an arm coupled to and extending from said surface, said arm having a distal end relative to said surface;
   a threaded stud coupled to and extending from said distal end of said arm wherein said arm is configured for coupling to a tree proximate a tree stand such that said surface is accessible to a person perched in the tree stand;
   a frame coupled to said surface, said arm having a proximal end relative to said surface, said proximal end of said arm being coupled to said frame;
   a projection coupled to and extending from said proximal end of said arm, said projection being a hook extending from said arm;
   an aperture extending through said frame, said projection being insertable through said aperture;
   a pin, said pin being engageable to said projection wherein said pin secures said projection in said aperture whereby said arm is coupled to said frame, said pin being insertable through said hook adjacent to a distal end of said hook relative to said arm; and
   a stabilizer being coupled to a proximal section of said hook relative to said arm, said stabilizer extending outwardly from opposite sides of said hook such that said frame is coplanar with said stabilizer when said hook is fully inserted through said aperture whereby said stabilizer inhibits pivoting of said frame about a distal section of said hook relative to said arm extending through said aperture.

8. The device of claim 1, further comprising said frame having a plurality of interconnected sections, said interconnected section being separable to facilitate storage and transport of said frame when not in use.

9. A tree stand table device comprising:
   a surface, said surface being defined by a sheet of material;
   an arm coupled to and extending from said surface, said arm having a distal end relative to said surface, said arm having a first section pivotally coupled to a second section;
   a frame coupled to said surface, said arm having a proximal end relative to said surface, said proximal end of said arm being coupled to said frame, said frame having a plurality of interconnected sections, said interconnected section being separable to facilitate storage and transport of said frame when not in use, said sheet of material being coupled to said frame such that said sheet of material is held in tension on said frame;
   a plurality of resilient cords, each of said resilient cords being coupled to said sheet of material wherein said resilient cords impart tension to said sheet of material wherein said sheet of material is secured to said frame;
   a projection coupled to and extending from said proximal end of said arm, said projection being a hook extending from said arm;
   an aperture extending through said frame, said projection being insertable through said aperture;
   a pin, said pin being engageable to said projection wherein said pin secures said projection in said aperture whereby said arm is coupled to said frame, said pin being insertable through said hook adjacent to a distal end of said hook relative to said arm;

a stabilizer being coupled to a proximal section of said hook relative to said arm, said stabilizer extending outwardly from opposite sides of said hook such that said frame is coplanar with said stabilizer when said hook is fully inserted through said aperture whereby said stabilizer inhibits pivoting of said frame about a distal section of said hook relative to said arm extending through said aperture;

a threaded stud coupled to and extending from said distal end of said arm wherein said arm is configured for coupling to a tree proximate a tree stand such that said surface is accessible to a person perched in the tree stand; and a cup holder coupled to and extending into said surface.

* * * * *